(12) United States Patent
Yamashita

(10) Patent No.: US 8,301,926 B2
(45) Date of Patent: Oct. 30, 2012

(54) DATA PROCESSING APPARATUS, IMAGE PROCESSING APPARATUS, AND METHOD OF PROCESSING DATA

(75) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 408 days.

(21) Appl. No.: 12/662,933

(22) Filed: May 12, 2010

(65) Prior Publication Data

US 2010/0293403 A1 Nov. 18, 2010

(30) Foreign Application Priority Data

May 13, 2009 (JP) ................................. 2009-116198

(51) Int. Cl.
*G06F 1/26* (2006.01)
(52) U.S. Cl. ......................... 713/323; 713/321; 713/322
(58) Field of Classification Search ........... 713/321–323
See application file for complete search history.

(56) References Cited

U.S. PATENT DOCUMENTS

| | | | |
|---|---|---|---|
| 8,020,025 B2* | 9/2011 | Hyatt ............................ | 713/502 |
| 2003/0140263 A1* | 7/2003 | Arends et al. ................. | 713/320 |
| 2007/0238437 A1* | 10/2007 | Jaakkola .................... | 455/343.1 |
| 2010/0218183 A1* | 8/2010 | Wang et al. ....................... | 718/1 |

FOREIGN PATENT DOCUMENTS

| | | |
|---|---|---|
| JP | 04-343142 A | 11/1992 |
| JP | 11-024914 A | 1/1999 |
| JP | 2003-195986 A | 7/2003 |
| JP | 2003-241582 A | 8/2003 |
| JP | 2006-035631 A | 2/2006 |
| JP | 2006-092481 A | 4/2006 |
| JP | 2007-188289 A | 7/2007 |
| JP | 2008-107914 A | 5/2008 |

* cited by examiner

*Primary Examiner* — Thuan Du
(74) *Attorney, Agent, or Firm* — Rabin & Berdo, P.C.

(57) ABSTRACT

A data processing apparatus is switchable between a power saving mode and a normal operating mode. A transition triggering event determining section determines an event (e.g., detection of a document or operation of a power saving key) that causes the data processing apparatus to shift from the power saving mode to the normal operating mode, and a transition triggering event holding section stores the event. Then, a mode switching section causes the data processing apparatus to shift from the power saving mode to the normal operating mode in accordance with the event. An execution priority determining section determines based on the event, an execution priority level and/or an order of precedence in which a plurality of programs are executed during the normal operating mode. A program controlling section executes the plurality of programs in accordance with the execution priority level and/or an order of precedence.

19 Claims, 10 Drawing Sheets

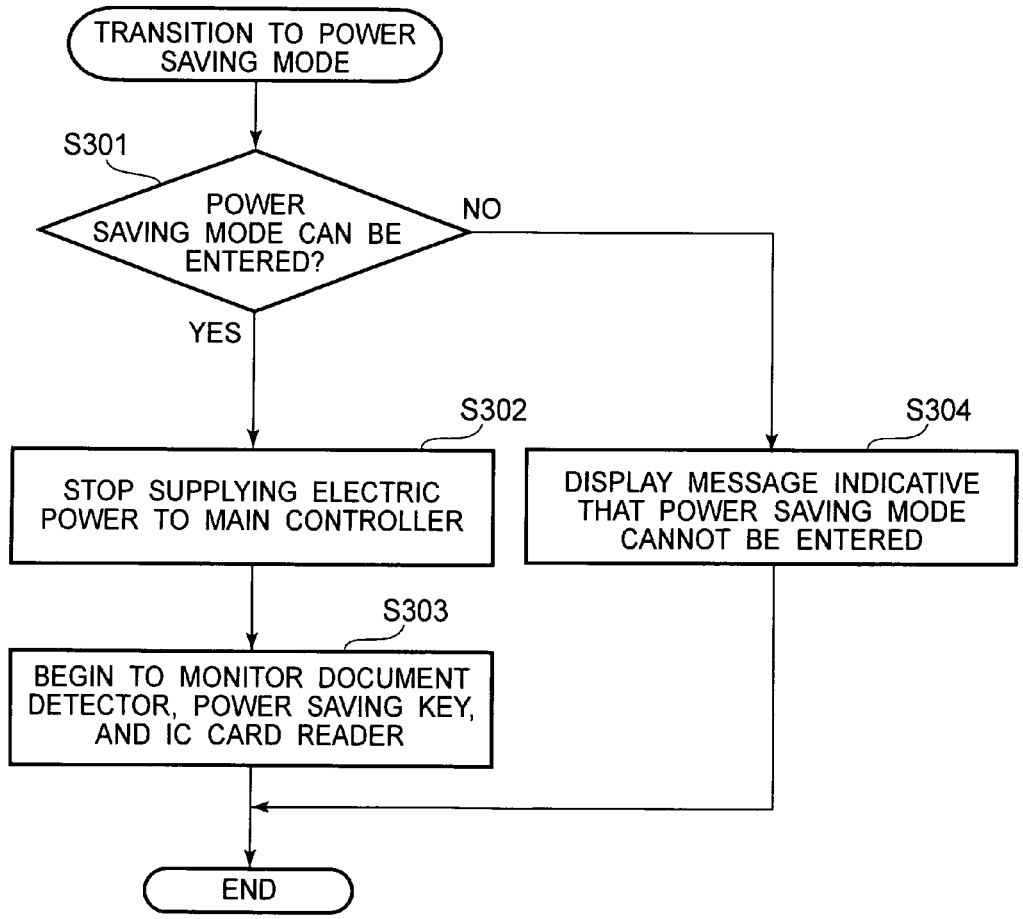

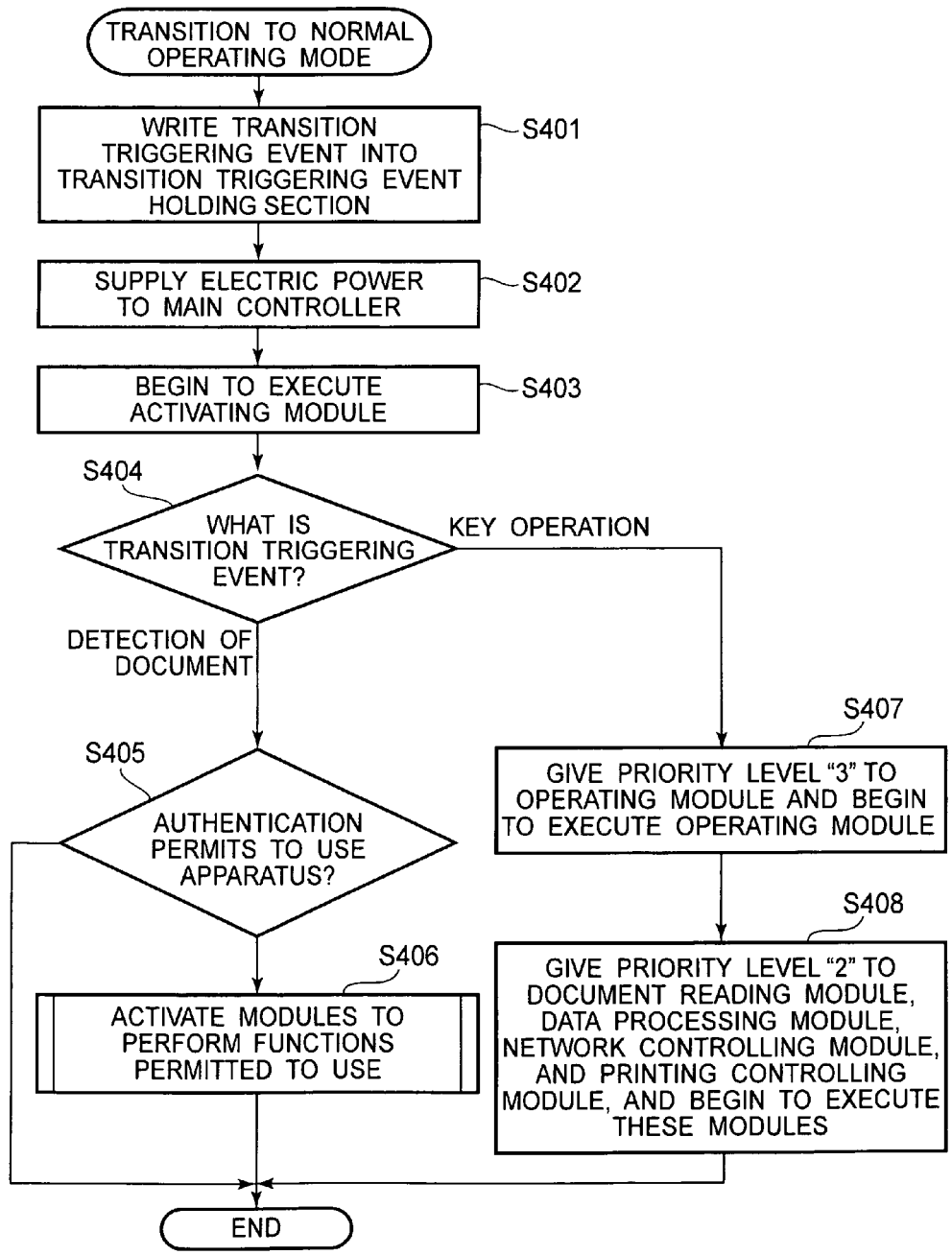

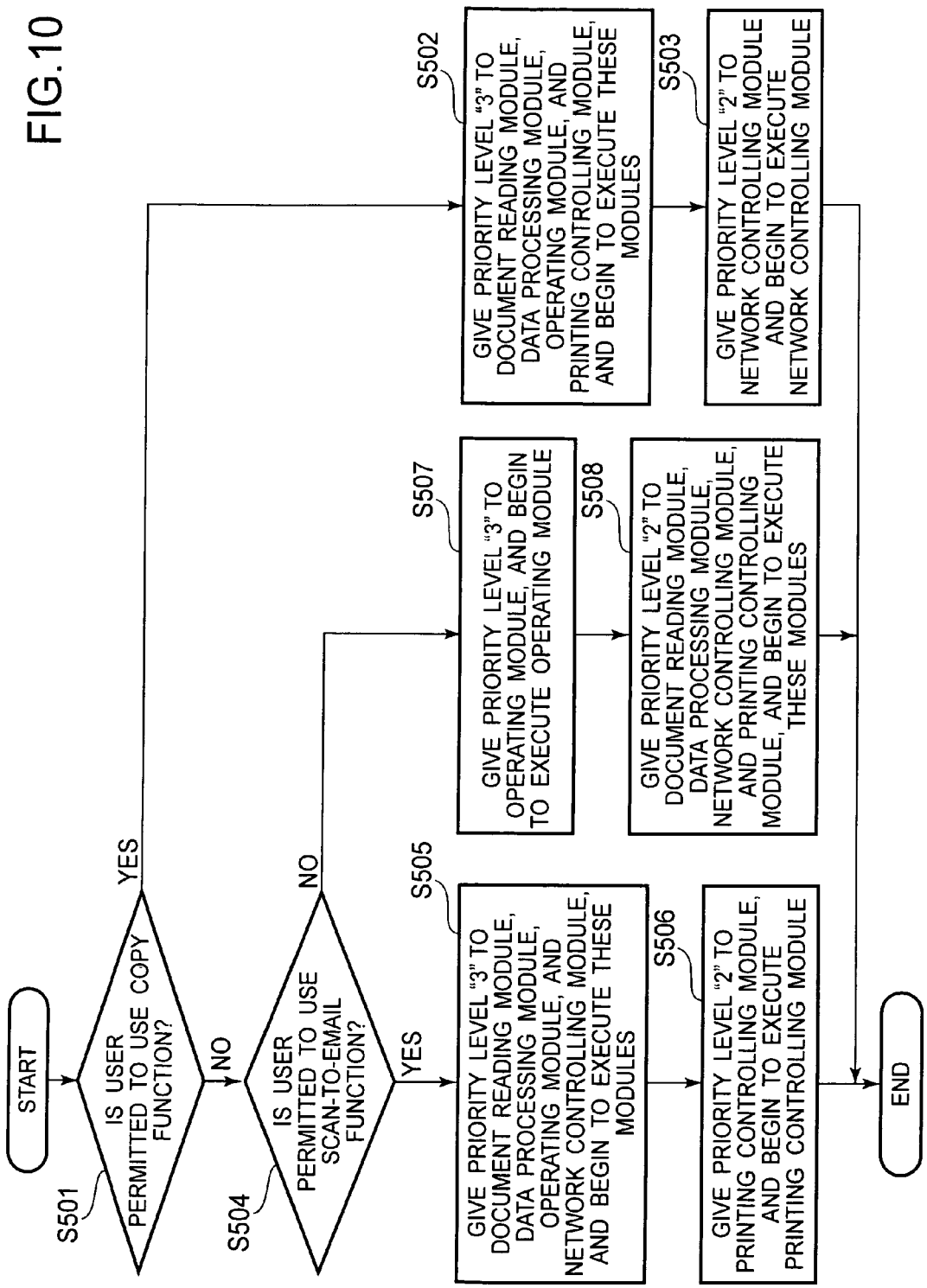

DATA PROCESSING APPARATUS, IMAGE PROCESSING APPARATUS, AND METHOD OF PROCESSING DATA

BACKGROUND OF THE INVENTION

1. Field of the Invention

The present invention generally relates a data processing apparatus. More particularly, the invention relates to a data processing apparatus adapted to operate in a power saving mode, and a method for processing data in the power saving mode.

2. Description of the Related Art

Among the known data processing apparatuses is one in which supply of power to a main controlling section including a central processing unit (CPU) is interrupted for minimizing power consumption. When a data processing apparatus is in a power saving mode, if the apparatus is to enter a data processing mode, the power supply must be supplied to the main CPU for the main CPU to resume execution of a control program. It is common that the apparatus jumps back to, for example, the top of a BOOT program held in a RAM so that the main CPU can execute the control program. Japanese Patent Application Laid-Open No. H11-24914 discloses one such apparatus. However, such a procedure fails to identify whether an operator depresses a power saving key of the data processing apparatus or the operator places a document on a document reading device, and gives no consideration to how the control program should be executed depending on these external events. This requires some time before a user's desired function becomes ready to operate, causing inconvenience to the user.

SUMMARY OF THE INVENTION

An object of the invention is to solve the aforementioned problems.

Another object of the invention is to provide a data processing apparatus and a method for processing data in which the time required for the user's desired function to become available can be shorted so that the user can execute his desired function readily.

A data processing apparatus is switchable between a power saving mode and a normal operating mode. A transition triggering event determining section determines a transition triggering event that causes the data processing apparatus to switch between the power saving mode and the normal operating mode. A transition triggering event holding section stores the transition triggering event determined by the transition triggering event determining section. A mode switching section for causing the apparatus to shift from the power saving mode to the normal operating mode in accordance with the determination by the transition triggering event determining section. An execution priority determining section for determining, based on the transition triggering event, an execution priority level and/or an order of precedence in which a plurality of programs are executed during the normal operating mode. A program controlling section executes the plurality of programs in accordance with the determination by the priority determining section.

A method is performed for processing data. The method includes:

- determining a transition triggering event upon which a data processing apparatus shifts from a power saving mode to a normal operating mode, and then holding the transition triggering event;
- shifting the data processing apparatus from the power saving mode to the normal operating mode in accordance with the transition triggering event;
- determining execution priority levels of a plurality of programs executed when the data processing apparatus is in the normal operating mode and/or an order of precedence in which the plurality of programs are executed; and
- performing execution of the plurality of programs in accordance with the execution priority levels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 8 is a flowchart illustrating the operation in which the data processing apparatus shifts from the normal operating mode to the power saving mode;

FIG. 9 is a flowchart illustrating the operation in which the data processing apparatus shifts from the power saving mode to the normal operating mode; and FIG. 10 is a flowchart illustrating the operation of the data processing apparatus at step S406 shown in FIG. 9.

DETAILED DESCRIPTION OF THE INVENTION

First Embodiment

A data processing apparatus 10 of a first embodiment is configured to operate so that data processing is performed smoothly after the data processing apparatus has shifted from a power saving mode to a normal operating mode. If the user wants to use a function such as a copying function that requires reading of a document, the functions or modules of a control program required for reading a document are given higher priorities in their execution. This minimizes the time before a document reader becomes ready to read the document, allowing smooth utilization of desired functions.

{Overall Configuration}

Figure 1:
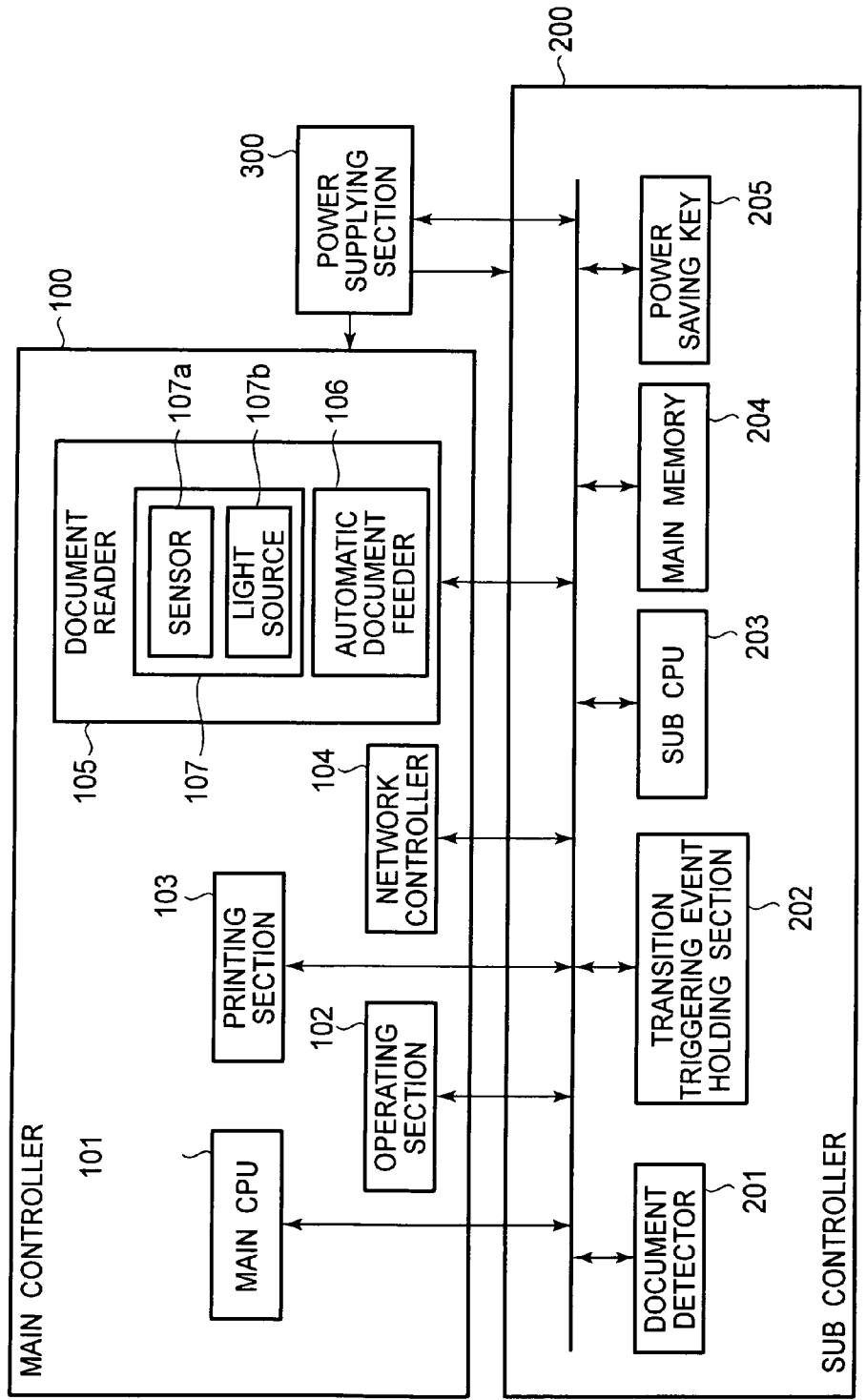
FIG. 1 is a block diagram illustrating a pertinent portion of a data processing apparatus of the present invention.

FIG. 1 is a block diagram illustrating a pertinent portion of the data processing apparatus of the present invention.

Referring to FIG. 1, the data processing apparatus 10 includes a main controller 100, a sub controller 200, and a power supplying section 300. The main controller 100 includes a main CPU 101, an operating section 102, a pint engine 103, a network controller 104, and a document reader 105. The sub controller 200 includes a document detector 201, a transition triggering event holding section 202, a sub CPU 203, a main memory 204, and a power saving key 205.

The main controller 100 includes a variety of sections that require no electric power when the data processing apparatus 10 remains in the power saving mode. The main CPU 101 executes a control program 401 (FIG. 2) which will be described later, thereby performing the control of the data processing apparatus 10. The operating section 102 includes operating keys and a liquid crystal display unit (not shown), and receives commands inputted by the user and displays the statuses of the data processing apparatus 10. The printing section 103 prints the image data that is read by the document reader 105 and is processed by the main CPU 101, and the image data that the main CPU 101 receives from the network controller 104. The network controller 104 transmits the image data, read by the document reader 105, in the form of email attachments, and sends print data received from outside the apparatus to the main CPU 101. The document reader 105 includes a document reading unit 107 and an automatic document feeder 106. The document reading unit includes a sensor (e.g., CCD) 107a and a light source 107b. The automatic document feeder 106 reads the document placed on the automatic document reader 106, and sends the data to the main CPU 101.

The sub controller 200 includes a variety of sections that require electric power when the data processing apparatus 10 remains in the power saving mode. Of these sections, a document detector 201 physically detects by a mechanical means when the document is placed on the automatic document feeder 106. The document detector 201 receives electric power from the same power supply line as other sections in the sub controller 200, but functions as a part of the automatic document feeder 106 that physically belongs to the main controller 100. The transition triggering event holding section 202 holds a transition triggering event that caused transition of the apparatus from the power saving mode to the normal operating mode. The sub CPU 203 monitors the document detector 201 and the power saving key 205 during the power saving mode, and controls the supply of electric power to the main controller 100 via the power supplying section 300.

The main memory 204 of the sub controller 200 stores the control program 401 (FIG. 2) when the main CPU 101 executes the controller program 401, and provides necessary memory areas required for execution of the control program 401. The power saving key 205 is connected to a common power supply shared with other sections within the sub controller 200, but functions physically as a part of the operating section 102 in the main controller 100. When the data processing apparatus 10 is in the power saving mode, the power saving key 205 receives a command inputted by the user, requesting transition to the normal operating mode. The power saving key 205 receives a command to enter the normal operating mode if the data processing apparatus 10 is in the power saving mode, and a command to enter the power saving mode if the apparatus 10 is in the normal operating mode.

The power supplying section 300 receives electric power from outside, and supplies electric power to the sub controller 200. The power supplying section 300 also supplies electric power to the main controller 100 upon reception of a command. The main controller 100, sub controller 200, and power supplying section 300 communicate, for example, data with one another over bus lines.

Figure 2:
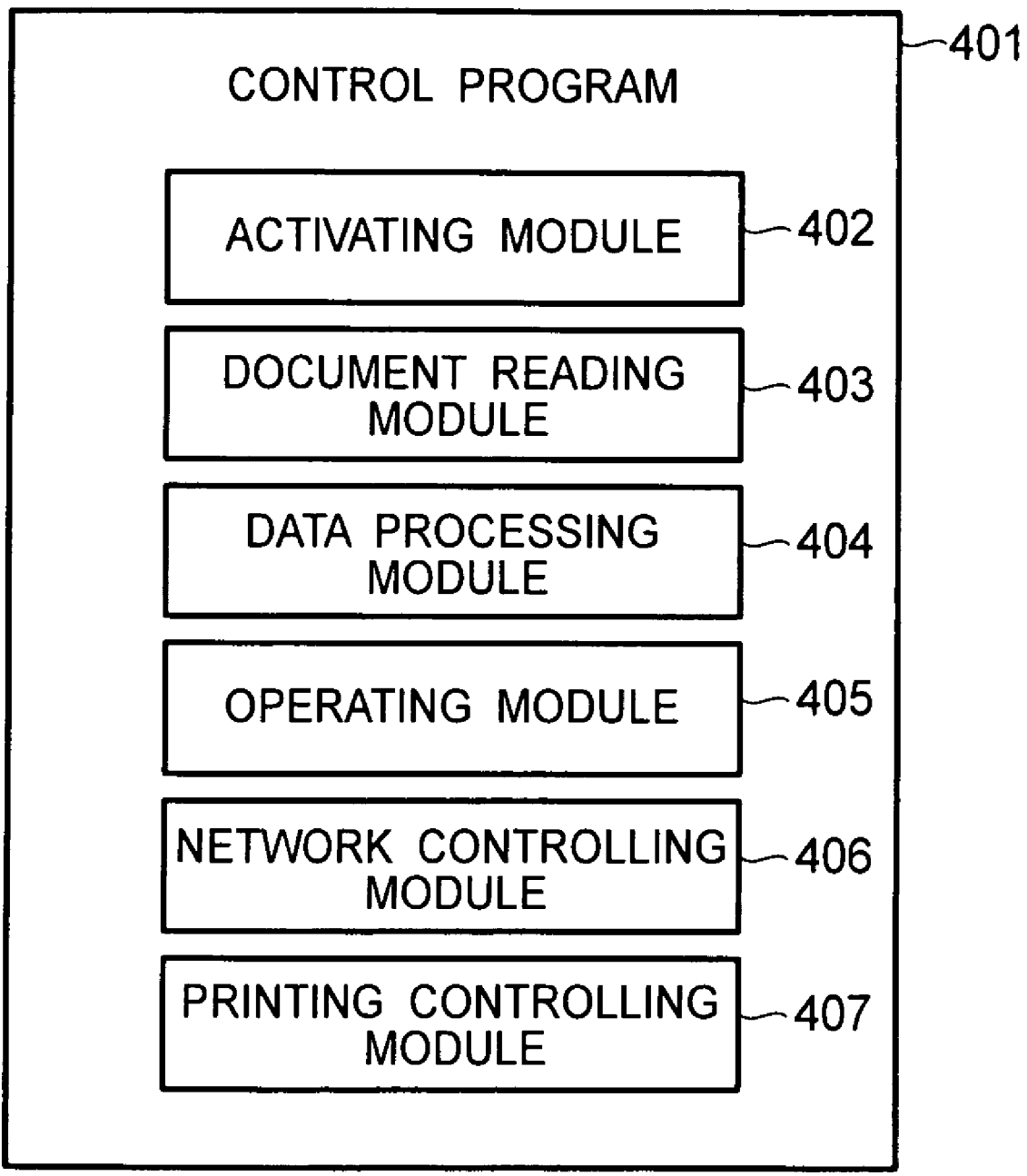
FIG. 2 illustrates the configuration of a control program executed by the main CPU for controlling the entire apparatus.

FIG. 2 illustrates the configuration of the control program executed by the main CPU 101 for controlling the entire data processing apparatus 10. Referring to FIG. 2, the control program 401 includes an activating module 402, a document reading module 403, a data processing module 404, an operating module 405, a network controlling module 406, and a printing controlling module 407. These modules are adapted to be executed in any order of precedence depending on the execution priority levels of modules involved in a particular function to be performed. Further, the execution priority levels may be set higher and/or the order in which the programs are executed may be increased. The main CPU 101 determines, based on the transition triggering event, an execution priority level and/or an order of precedence in which a plurality of programs are executed during the normal operating mode.

When the data processing apparatus 10 shifts from the power saving mode to the normal operating mode, the activating module 402 begins to execute the document reading module 403, data processing module 404, operating module 405, network controlling module 406, and printing controlling module 407. Specifically, the CPU 101 begins the execution of these modules under the control of the activating module 402. For the sake of simplicity, a description will be given as if the activation module 402 controls the other modules.

The document reading module 403 controls the document reader 105, thereby generating image data of a document, and the data processing module 404 processes the image data generated by the document reading module 403. The operating module 405 controls the operating section 102. The network controlling module 406 controls the network controller 104. The printing controlling module 407 controls the printing section 103.

The sub CPU 203 constitutes a transition triggering event determining section for identifying whether a triggering transition event is detected by the document detector 201 or the power saving key 205. The sub CPU 203 also constitutes a mode switching section, and controls the power supplying section 300. The main CPU 101 and activating module 402 constitute a priority determining section and a program controlling section, respectively.

{Normal Operating Mode to Power Saving Mode}

Figure 3:
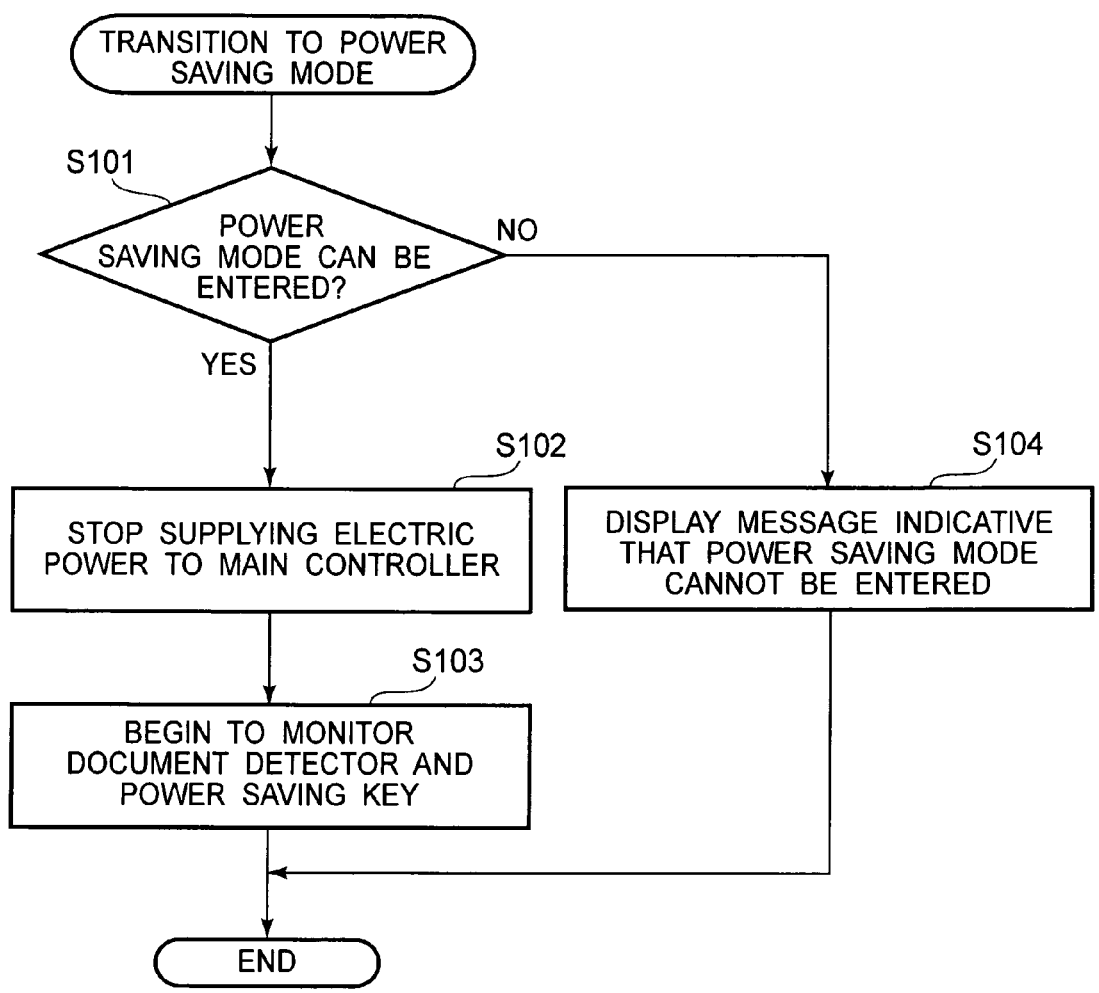
FIG. 3 is a flowchart illustrating the operation in which the data processing apparatus shifts from a normal operating mode to a power saving mode.

FIG. 3 is a flowchart illustrating the operation in which the data processing apparatus 10 shifts from the normal operating mode to the power saving mode.

A description will be given of the transition for the data processing apparatus 10 of the aforementioned configuration to shift from the normal operating mode to the power saving mode. The description will be given with reference to the flowchart shown in FIG. 3 along with FIGS. 1 and 2.

When the power saving key 205 is operated to command to shift from the normal operating mode to the power saving mode, the main CPU 101 makes a decision to determine whether the power saving mode can be entered, i.e., whether the image data is being read through the document reader 105 or the image data read through the document reader 105 is being processed (step S101). If it is determined that the power saving mode can be entered (YES at step S101), the main CPU 101 commands the sub CPU 203 to shift to the power saving mode. The sub CPU 203 commands the power supplying section 300 to stop supplying electric power to the main controller 100 (step S102). The sub CPU 203 then begins to monitor the document detector 201 and power saving key 205 (step S103). This completes the transition from the normal operating mode to the power saving mode. If it is determined that the power saving mode cannot be entered (NO at step S101), the main CPU 101 displays on the operating section 102 a message indicative that the power saving mode cannot be entered (step S104).

{Power Saving Mode to Normal Operating Mode}

Figure 4:
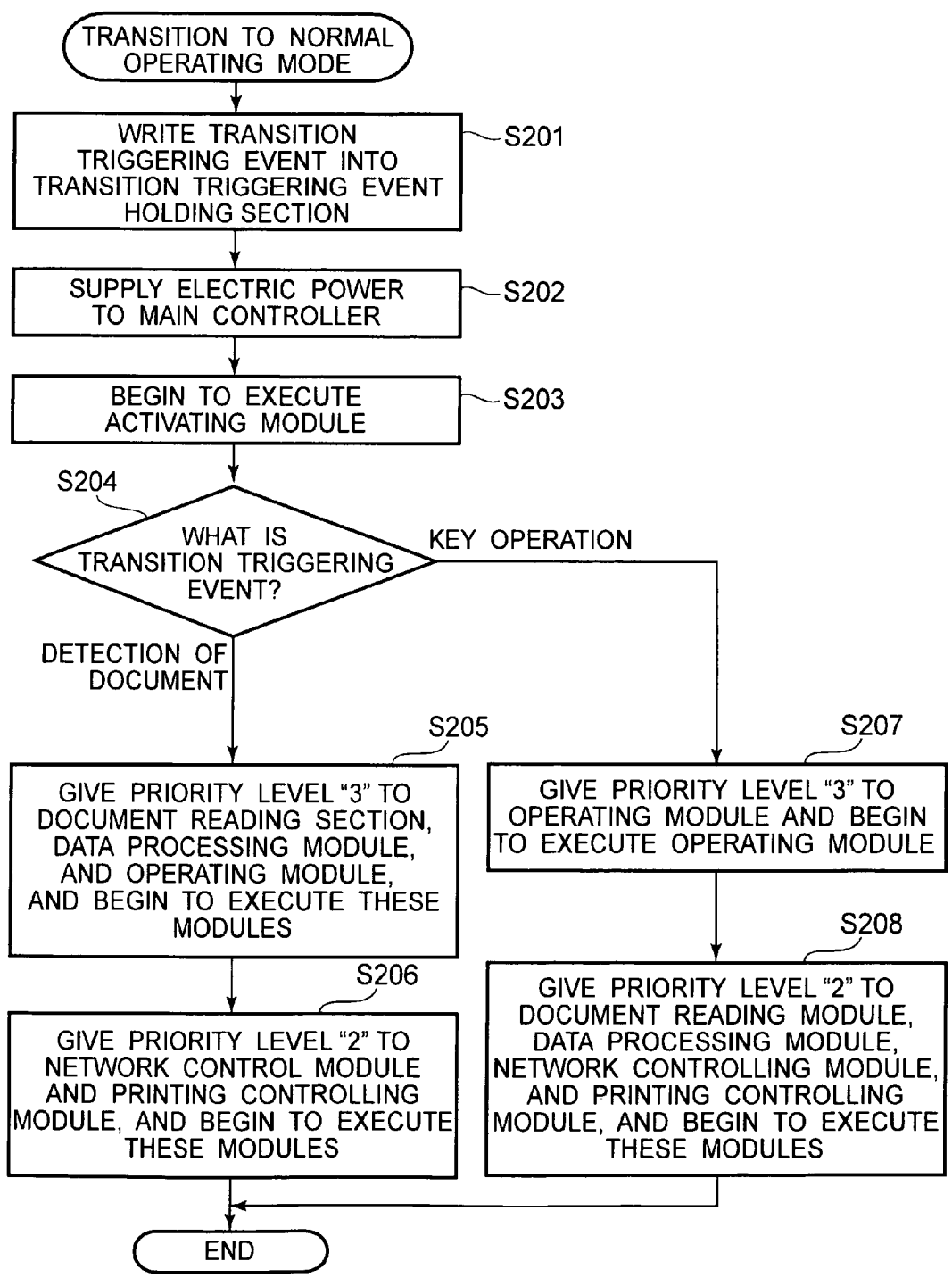
FIG. 4 is a flowchart illustrating the operation in which the data processing apparatus shifts from the power saving mode to the normal operating mode.

FIG. 4 is a flowchart illustrating the operation in which the data processing apparatus 10 shifts from the power saving mode to the normal operating mode.

A description will be given of the operation in which the data processing apparatus 10 shifts from the power saving mode to the normal operating mode. The description will be given with reference to the flowchart illustrated in FIG. 4 along with FIGS. 1 and 2.

When the document detector 201 detects a document placed on the automatic document feeder 106 or operation of the power saving key 205 by the user, the sub CPU 203 writes a corresponding transition triggering event into the transition triggering event holding section 202, the transition triggering event indicating whether the document detector 201 has detected a document or the user has operated the power saving key 205 (step S201). The sub CPU 203 then commands the power supplying section 300 to supply electric power to the main controller 100. The power supplying section 300 then supplies electric power to the main controller 100 (step S202).

Upon reception of electric power, the main CPU 101 is turned on to begin execution of the activating module 402 of the control program 401 (FIG. 2) stored in the main memory 204 (step S203). The activation 402 refers to the transition triggering event holding section 202 to determine the transition triggering event (step S204). Specifically, the main CPU 101 determines the transition triggering event under the control of the activating module 402. For simplicity's sake, a description will be given as if the activating module 402 performs this determination.

If it is determined that the document detector 201 has detected a document (detection of document), the activating module 402 gives an execution priority level "3" to the document reader 403, data processing module 404, and operating module 405 in the control program 401, and then begins execution of these modules (step S205). The activating module 402 then gives a priority level "2" to the network control module 406 and printing controlling module 407, and begins the execution of these modules (step S206).

If a plurality of modules are executed concurrently by a single CPU, each module may be divided into multiple small units or portions different in length from those of remaining modules, each small unit or portion being executed during a specified execution period of time. Thus, the length of the specified execution period of time varies from module to module depending on the execution priority level. Execution priority levels "1," "2," and "3" are used in this embodiment, indicating the specified execution period of time or amount of time given to execute small units or portions of the respective modules when they are executed concurrently by the main CPU 101. Therefore, the larger the value of the execution priority level given to a module is, the longer the execution period of time is given so that the module can be executed faster than a module of a lower execution priority level. For example, if modules have an equal execution priority level, the CPU 101 executes each small portion of the modules for an equal execution period of time.

If it is determined at step S204 that the power saving key 205 was operated (key operation), the activating module 402 gives the execution priority level "3" to the operating module 405 of the control program 401, and begins execution of the operating modules 405 (step S207). The activating module 402 then gives the execution priority level "2" to the document reading module 403, data processing module 404, network controlling module 406, and printing controlling module 407, and then begins execution of these modules (step S208).

When the data processing apparatus 10 of the first embodiment shifts from the power saving mode to the normal operating mode, a check is made to determine whether the document detector 201 detected a document or the user operated the power saving key 205. The activating module 402 determines the execution priority levels of the involved modules and the order of precedence in which the involved modules are executed, depending on the type of transition triggering event, i.e., detection of a document by the detector or operation of the power saving key 205 by the user.

For example, when a document is read, the light source 107b is turned on. There will be some time before the light source becomes sufficiently ready for reading the document. For this reason, when a copy operation is performed, the execution of the document reading module 403 should be begun earlier than any other module so that the light source 107b may be turned on as soon as possible.

If the user places a document on the automatic document feeder 106 for making a copy, the activating module 402 gives higher precedence to the modules involved in copying (higher order in which the modules involved in copying operation start to be executed when they are concurrently executed) and raises their execution priority levels. If the user operated the power saving key 205, the activating module 402 raises the order of precedence in which the involved modules for inputting commands through the operating section are executed, and raises their execution priority levels.

Alternatively, the control may be performed by giving a higher precedence to a module involved in a specified operation while not raising their execution priority levels, depending on the specified operation. Still alternatively, the control may be performed by raising an execution priority level of a module involved in a specified operation, depending on the specified operation while not giving higher precedence to the module.

The first embodiment has been described with respect to the configuration in which the document detector 201 detects when a document is placed on the automatic document feeder 106. However, the invention is not limited to this configuration. The data processing apparatus 10 may also be configured so that the document detector 201 detects a document placed on the flat bed scanner, in which case a check is made to determine whether the document is on the flat bed before the cover is opened and after the cover is closed, thereby distinguishing when the document remains left out from when the document is placed normally.

Second Embodiment

Figure 5:
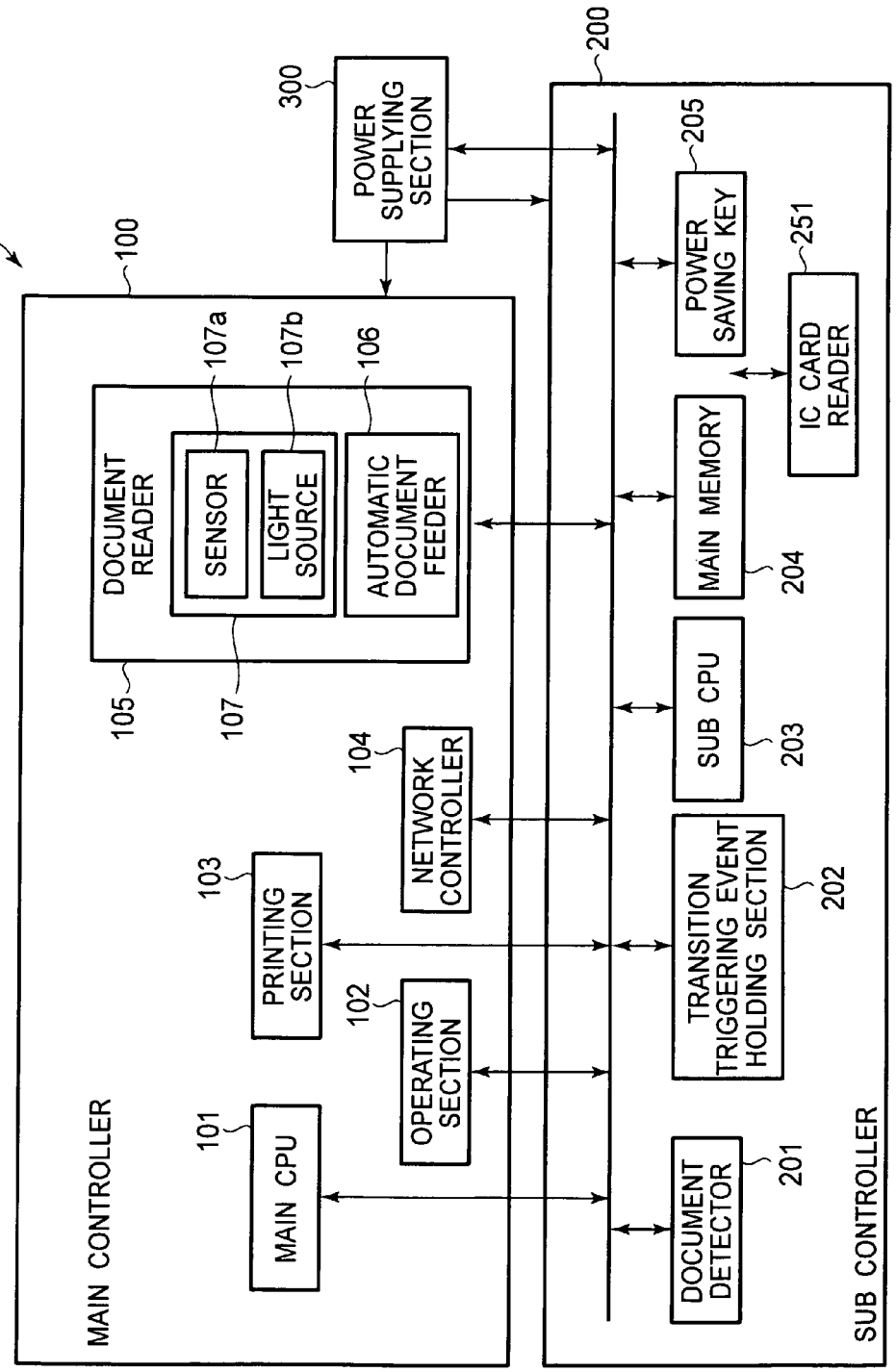
FIG. 5 is a block diagram illustrating pertinent portions of a data processing apparatus of a second embodiment.

FIG. 5 is a block diagram illustrating pertinent portions of a data processing apparatus 20 of a second embodiment.

Figure 6:
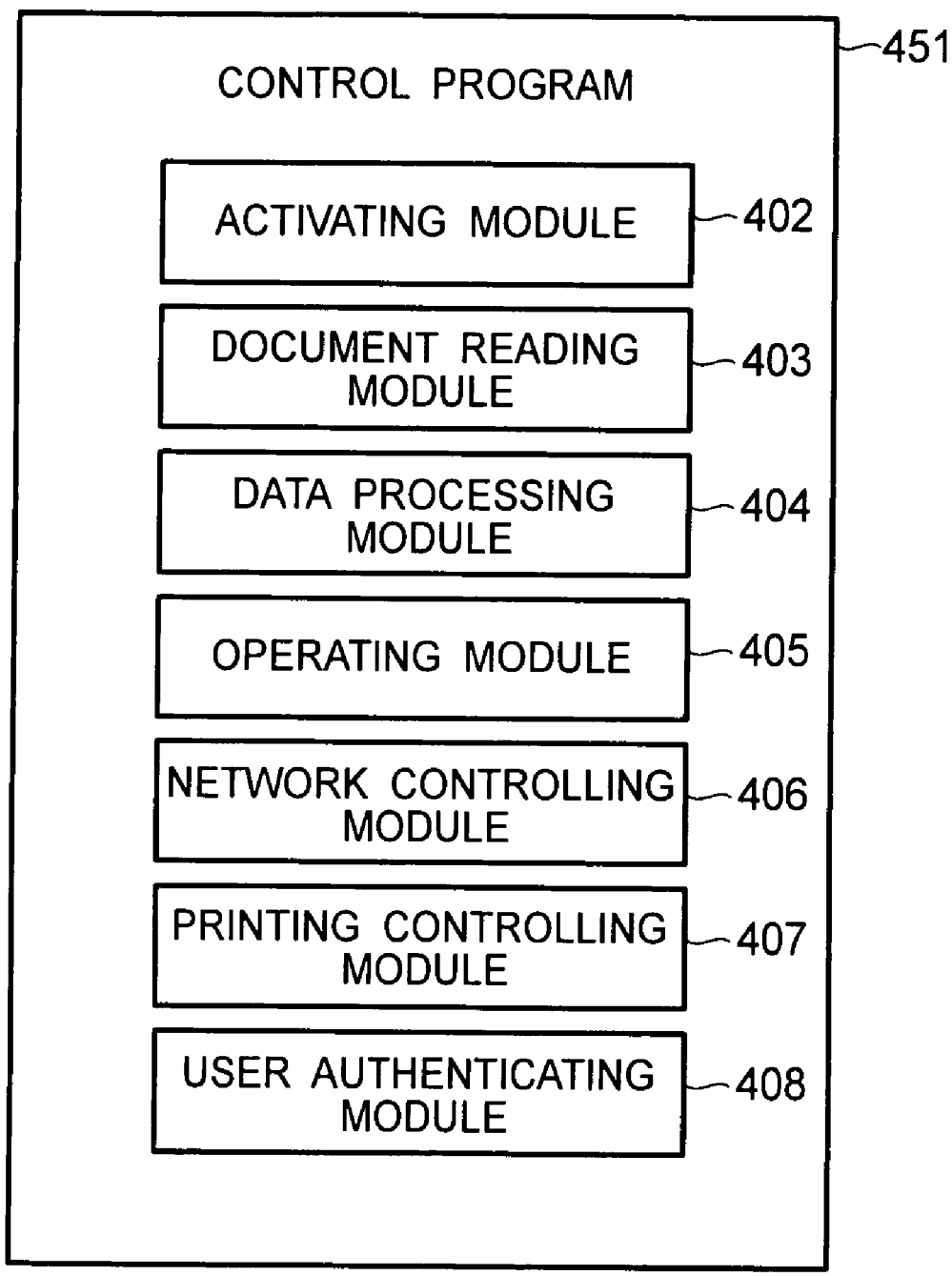
FIG. 6 illustrates the configuration of a control program of the second embodiment.

FIG. 6 illustrates the configuration of a control program of the second embodiment.

The data processing apparatus 20 differs from the data processing apparatus 10 in that the sub controller 250 includes an IC card reader 251 and a main memory 254 stores a control program 451 (FIG. 6). The control program 451 is a modification of the control program 401 of the first embodiment. Elements similar to those of the first embodiment have been given the same reference numerals and their description and drawings are omitted. A description will be given only of portions different from the first embodiment.

The IC card reader 251 reads user information that is stored on the IC card (not shown).

Figure 7:
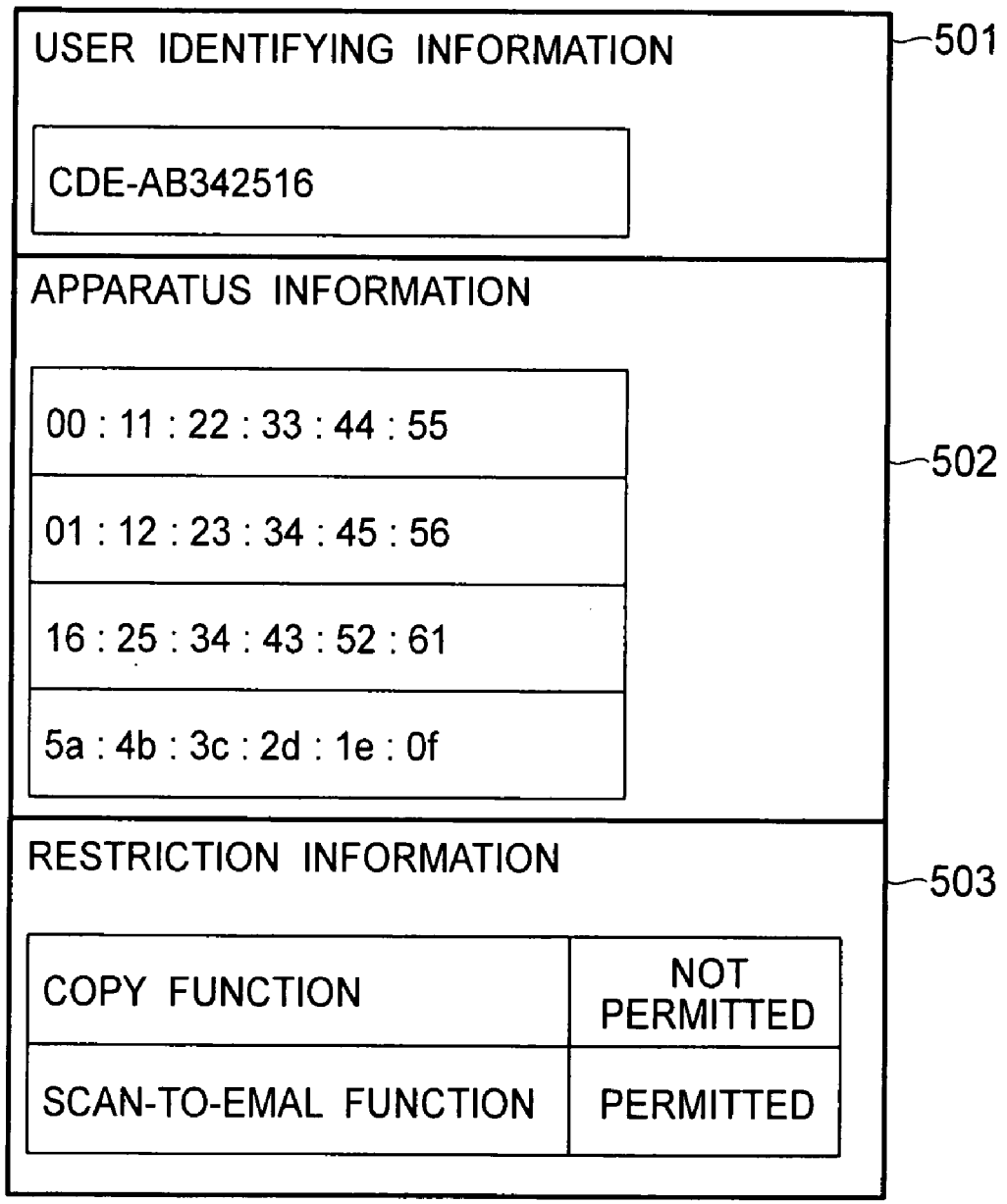
FIG. 7 illustrates an example of user information held in an IC card.

FIG. 7 illustrates an example of the user information held in the IC card.

Referring to FIG. 7, the user information includes user identifying information 501, apparatus information 502, and restriction information 503. The user identifying information 501 identifies individual users. The apparatus information 502 represents the network physical address of an apparatus that a user having the user identifying information 501 is permitted to use. The restriction information 503 represents functions that a user having the user identifying information is permitted and not permitted to use.

FIG. 6 illustrates the configuration of the control program 451 that is executed when the main CPU 101 controls the entire apparatus. Referring to FIG. 6, the control program 451 differs from the control program 401 (FIG. 2) of the first embodiment in that a user authenticating module 408 is added. The user authenticating module 408 authenticates users against the user information read through the IC card reader 251. The remaining modules are the same as those of the control program 401 (FIG. 2) of the first embodiment, and their detailed description is omitted.

{Normal Operating Mode to Power Saving Mode}

FIG. 8 is a flowchart illustrating the operation in which the data processing apparatus 20 shifts from a normal operating mode to a power saving mode.

The operation of the data processing apparatus 20 of the aforementioned configuration will be described in terms of transition from the normal operating mode to the power saving mode with reference to the flowchart illustrated in FIG. 8 along with FIGS. 5-7.

When a power saving key 205 is operated by the user to command to shift from the normal operating mode to the power saving mode, the main CPU 101 makes a decision to determine whether the image data is being read through a document reader 105 or the image data read through the document reader 105 is being processed (step S301). If it is determined that the power saving mode can be entered (YES at step S301), the main CPU 101 commands the sub CPU 203 to shift to the power saving mode. The sub CPU 203 commands the power supplying section 300 to stop supplying electric power to the main controller 100 (step S302). The sub CPU 203 then begins to monitor the document detector 201, power saving key 205, and the card reader 251 (step S303). If it is determined that the power saving mode cannot be entered (NO at step S301), the main CPU 101 displays on the operating section 102 a message indicative that the power saving mode cannot be entered (step S304). This completes the transition from the normal operating mode to the power saving mode.

{Power Saving Mode to Normal Operating Mode}

FIG. 9 is a flowchart illustrating the operation in which the data processing apparatus 20 shifts from the power saving mode to the normal operating mode.

The operation of the data processing apparatus 20 will be described in terms of transition from the power saving mode to the normal operating mode with reference to the flowchart illustrated in FIG. 9 along with FIGS. 5-7.

When the IC card reader 251 detects an IC card or when the user operates the power saving key 205 to command to shift from the power saving mode to the normal operating mode, the sub CPU 203 writes a corresponding transition triggering event into a transition triggering event holding section 202, the transition triggering event indicating whether the user inserted the IC card into the IC card reader 251 and requested authentication or the user operated the power saving key 205 (step S401). The sub CPU 203 then commands the power supplying section 300 to supply electric power to the main controller 100. The power supplying section 300 then supplies electric power to the main controller 100 (step S402).

Upon reception of electric power, the main CPU 101 is turned on to begin execution of the activating module 402 of the control program 451 (FIG. 6) stored in the main memory 254 (step S403). The activation module 402 refers to the transition triggering event holding section 202 to determine the transition triggering event (step S404). Specifically, the main CPU 101 determines the event under the control of the activating module 402. For simplicity's sake, a description will be given as if the activating module 402 performs this determination.

If it is determined that the user requested authentication (request for user authentication), the activating module 402 executes the user authenticating module 408 (step S405). The user authenticating module 408 reads the user identifying information 501, apparatus information 502, and restriction information 503 as shown in FIG. 7 from the IC card reader 251, and stores these items of information into the main memory 254. The user authenticating module 408 then makes a decision to determine whether the apparatus information 502 contains the network physical address of the data processing apparatus 20 obtained from the network controller 104 (step S405). If the answer is YES at step S405, then the program proceeds to step S406. If the answer is NO at step S405, the program ends.

FIG. 10 is a flowchart illustrating the operation of the data processing apparatus 20 at step S406 shown in FIG. 9.

The activating module 402 activates, at step S406 shown in FIG. 10, the respective modules of the control program 451 to perform the functions that the user is permitted to use.

If it is determined at step S404 that the user operated the power saving key 205 (key operation), the activating module 402 gives an execution priority level "3" to the operating module 405 of the control program 451 (step S407). The activating module 402 then gives an execution priority level "2" to a document reading module 403, a data processing module 404, a network controlling module 406, and a printing controlling module 407, and then begins to execute of these modules (step S408).

The activating module 402 reads the restriction information 503 (FIG. 7) from the main memory 254 as shown in FIG. 10, and makes a decision to determine whether the user is permitted to use a copy function (step S501). If the answer is YES, the activating module 402 gives the execution priority level "3" to the document reading module 403, data processing module 404, operating module 405, and printing controlling module 407, and then begins the execution of these modules (step S502). The activating module 402 then gives the execution priority level "2" to the network controlling module 406, and begins execution of these modules (step S503).

If the answer is NO at step S501, the activating module 402 reads the restriction information 503 (FIG. 7) from the main memory 254, and makes a decision to determine whether the user is permitted to use a scan-to-email function (step S504). If the answer is YES at step S504, the activating module 402 gives the execution priority level "3" to the document reading module 403, data processing module 404, operating module 405, and network controlling module 406, and then begins execution of this modules (step S505).

If the answer is NO at step S504, the activating module 402 gives the execution priority level "3" to the operating module 405, and begins execution of this modules (step S507). The activating module 402 then gives the execution priority level "2" to the document reading module 403, data processing module 404, network controlling module 406, and printing controlling module 407, and then begins execution of these modules (step S508).

As described above, when the data processing apparatus 20 shifts from the power saving mode to the normal operating mode, a check is made to determine whether the IC card reader 251 detected an IC card or a user requested user authentication, thereby determining the execution priority levels of the involved modules and the order of precedence in which the respective modules are executed, depending on the type of an event, i.e., detection of a document by the document detector or operation of the power saving key 205 by the user so that the respective functions are promptly performed after the data processing apparatus 20 has shifted to the normal operating mode. If the user requests authentication against the IC card, the activating module 402 gives higher precedence to the modules involved in authentication (higher order in which the modules involved in authentication start to be executed when modules are concurrently executed) in accordance with the restriction information 503 (permit to use/restrict to use), and also raises the execution priority levels of the modules involved in authentication.

Although, the second embodiment has been described with respect to an example in which the IC card holds the user identifying information 501, apparatus information 502, and restriction information 503, the invention is not limited to this embodiment. A variety of modifications may be made, for example, these items of information may be held in a USB memory, and a USB controller and a USB memory may be used in place of an IC card reader and an IC card, respectively.

As described above, after the data processing apparatus 20 has shifted from the power saving mode to the normal operating mode, the data processing apparatus 20 operates smoothly in the normal operating mode. For example, if a user uses the apparatus upon authentication against the information held in an IC card, a function which the user is permitted to use is activated based on the information held in the IC card of the user, the functions necessary for reading a document being given higher priorities in their execution. Thus, if the user wants to use a function such as a copying function that requires reading of a document, the functions necessary for reading the document are given higher priorities in their execution. This minimizes the time before the document reader becomes ready to read the document, allowing smooth, efficient utilization of desired functions.

While the data processing apparatus has been described in terms of a multi function apparatus incorporating a document reading means, a printing means, and a network transmitting means, the present invention may also be applied to facsimile machines and printers.

What is claimed is:

1. A data processing apparatus switchable between a power saving mode and a normal operating mode, comprising:
   a transition triggering event determining section for determining a transition triggering event that causes the data processing apparatus to shift from the power saving mode to the normal operating mode;
   a transition triggering event holding section for storing the transition triggering event determined by the transition triggering event determining section;
   a mode switching section for causing the data processing apparatus to switch between the power saving mode and the normal operating mode in accordance with the determination by the transition triggering event determining section;
   an execution priority determining section for determining, based on the transition triggering event, an execution priority level and/or an order of precedence in which a plurality of programs are executed during the normal operating mode; and
   a program controlling section for executing the plurality of programs in accordance with the determination by the priority determining section.

2. The data processing apparatus according to claim 1 further comprising:
   a document reader;
   a document detector for detecting a document that should be read by the document reader;
   wherein the transition triggering event is detection of the document by the document detector.

3. The data processing apparatus according to claim 2, wherein the priority determining section sets execution priority levels of programs executed when the document reader reads the document so that the execution priority levels are higher and/or the order in which the programs are executed is increased.

4. The data processing apparatus according to claim 1 further comprising an authenticating section for authenticating a user of the data processing apparatus;
   wherein the transition triggering event is authentication of the user.

5. The data processing apparatus according to claim 4, wherein the priority determining section sets, based on authentication by the authenticating section, execution priority levels of programs that the user is permitted to use so that the execution priority levels are higher and/or the order in which the programs are executed is increased.

6. The data processing apparatus according to claims 1 further comprising a main controller to which a first power supply is supplied only when the data processing apparatus is in the normal operating mode, and a sub controller (200) to which a second power supply is supplied when the data processing apparatus is in the normal operating mode and when the data processing apparatus is in the power saving mode.

7. The data processing apparatus according to claims 1, wherein when the plurality of programs are executed concurrently, a time for which each one of the plurality of programs is executed increases with increasing a value of the execution priority level.

8. An image processing apparatus switchable between a power saving mode and a normal operating mode, comprising:
   a transition triggering event determining section for determining a transition triggering event that causes the image processing apparatus to shift from the power saving mode to the normal operating mode;
   a transition triggering event holding section for storing the transition triggering event determined by the transition triggering event determining section;
   a mode switching section for causing the image processing apparatus to shift from the power saving mode to the normal operating mode in accordance with the determination by the transition triggering event determining section;
   an execution priority determining section for determining, based on the transition triggering event, an execution priority level and/or an order of precedence in which a plurality of programs are executed during the normal operating mode; and a program controlling section for executing the plurality of programs in accordance with the determination by the priority determining section.

9. The image processing apparatus according to claim 8 further comprising:
a document reader);
a document detector for detecting a document that should be read by the document reader;
wherein the transition triggering event is detection of the document by the document detector.

10. The image processing apparatus according to claim 9, wherein the priority determining section sets execution priority levels of programs executed when the document reader reads the document so that the execution priority levels are higher and/or the order in which the programs are executed is increased.

11. The image processing apparatus according to claim 8 further comprising an authenticating section for authenticating a user of the image processing apparatus;
wherein the transition triggering event is authentication of the user.

12. The image processing apparatus according to claim 11, wherein the priority determining section sets, based on authentication by the authenticating section, execution priority levels of programs that the user is permitted to use so that the execution priority levels are higher and/or the order in which the programs are executed is increased.

13. A method for processing data, comprising:
determining a transition triggering event upon which a data processing apparatus shifts from a power saving mode to a normal operating mode, and then holding the transition triggering event;
shifting the data processing apparatus from the power saving mode to the normal operating mode in accordance with the transition triggering event;
determining execution priority levels of a plurality of programs executed when the data processing apparatus is in the normal operating mode and/or an order of precedence in which the plurality of programs are executed; and
performing execution of the plurality of programs in accordance with the execution priority levels.

14. The method according to claim 13, wherein the transition triggering event is detection of a document placed on a document reader.

15. The method according to claim 14, wherein the determining is performed such that programs involved in reading the document are given higher execution priority levels and/or or higher order of precedence.

16. The method according to claim 13, wherein the transition triggering event is a request for user authentication.

17. The method according to claim 16, wherein the determining is performed such that programs involved in reading the document are given higher execution priority levels and/or or higher order of precedence.

18. The method according to claim 13, further comprising supplying electric power to a main controller only when the data processing apparatus is in the normal operating mode and to a sub controller when the data processing apparatus is in the power saving mode and in the normal operating mode.

19. The method according to claim 13, wherein programs having higher execution priority levels are executed longer time when the plurality of programs are concurrently executed.

* * * * *